April 8, 1958  D. W. LYNCH  2,829,536
DETENT MECHANISM
Filed Oct. 3, 1951  2 Sheets-Sheet 1
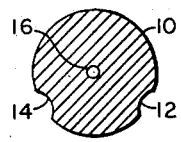
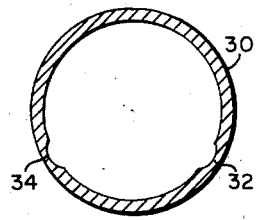 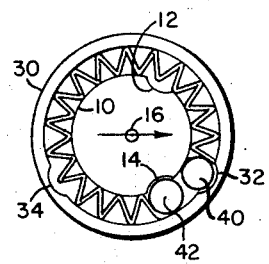
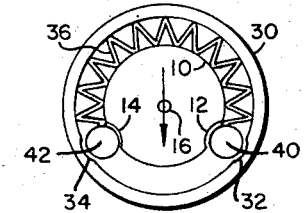 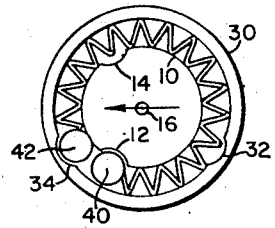
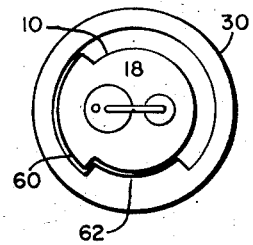
INVENTOR
DONALD W. LYNCH
BY
ATTORNEYS

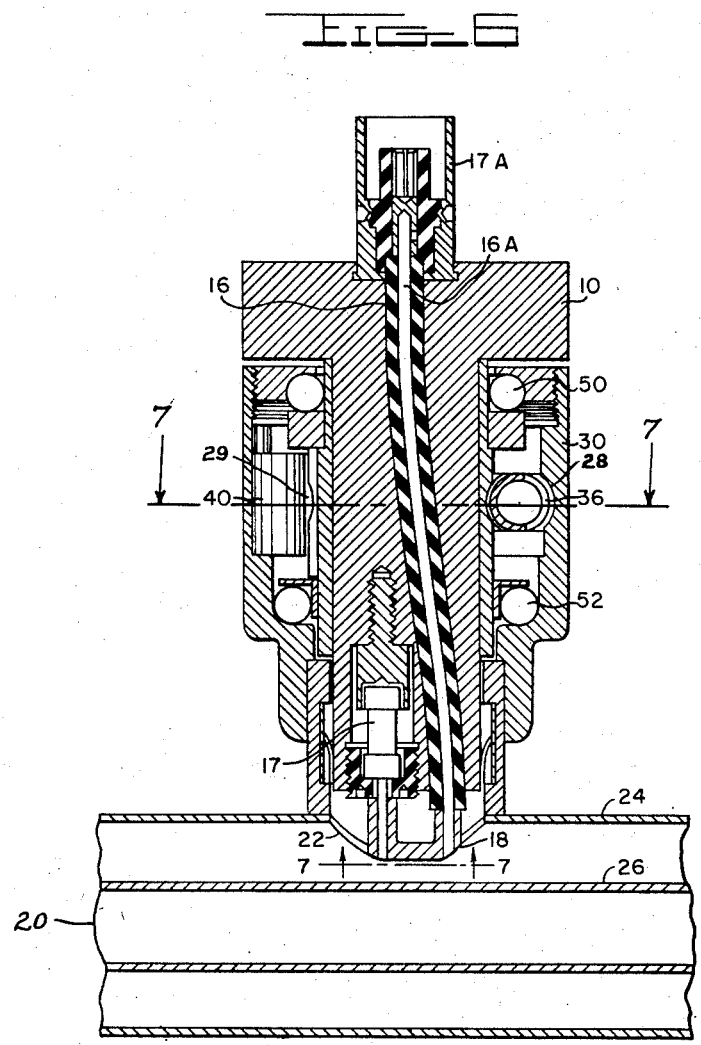

United States Patent Office 2,829,536
Patented Apr. 8, 1958

2,829,536

DETENT MECHANISM

Donald Walter Lynch, Washington, D. C.

Application October 3, 1951, Serial No. 249,607

10 Claims. (Cl. 74—527)

(Granted under Title 35, U. S. Code (1952), sec. 266)

This invention relates to a detent mechanism and is more especially adapted to be used as a detent mechanism for a directional probe.

In a transmission line going, for example, between an antenna and a transmitter, it is desirable to have a measurement of the incident and reflected power as a means of determining the standing wave ratio of the line. This can be obtained by inserting into the line a directional probe which can be rotated 180 degrees about an axis perpendicular to the axis of the transmission line. Therefore it can be seen that it is desirable to have a detent mechanism capable of moving a directional probe into these two positions and securely holding the probe in each of its two selected positions.

It is an object of this invention to provide a detent mechanism capable of moving a probe or tool into a selected position.

It is a further object of this invention to provide a detent mechanism which will hold the probe or tool firmly in position once the tool has been moved to a desired position.

It is a further object of this invention to provide a detent mechanism with positive action and having no dead spots between the selected positions.

It is a further object of this invention to provide a detent mechanism having a portion thereof free for use by a probe or similar article.

It is a further object of this invention to provide a detent mechanism which requires only rotary activating motion and no cocking or locking action to operate the mechanism.

It is a further object of this invention to provide a detent mechanism having a long large spring mounted in a compact unit.

For a further comprehension of the invention, and of the objects and advantages thereof, reference will be had to the following description and accompanying drawings, and to the appended claims in which the various novel features of the invention are more particularly set forth.

Referring now to the drawings wherein a preferred embodiment of the novel detent device is shown:

Figure 1 is a plan of one element of the detent mechanism;

Figure 2 is a plan view of a second element of the detent mechanism;

Figure 3 is a plan view of the detent mechanism in one position of its operation;

Figure 4 is plan view of the detent mechanism in another position of its operation;

Figure 5 is a plan view of the detent mechanism in still another position of its operation;

Figure 6 is an elevational view of the detent mechanism as used with a transmission line;

Figure 7 is a view taken along lines 7—7 of Figure 6.

The invention, in broad terms, contemplates using a barrel or rotor encircled by a sleeve or stator. Placed within an annular groove in the inner surface of the stator between the rotor and the stator is a long coiled helical spring and two cylindrical rollers. These cylindrical rollers have diameters which are greater than the clearance between the rotor and the stator. The cylindrical rollers are designed to fit into depressions formed in the stator and rotor, respectfully.

Referring specifically to the drawings, Figure 1 discloses the barrel or rotor 10 of the detent mechanism. As can be seen from Figure 1, the rotor 10 has two linear depressions 12 and 14 in its outer surface. Also as is apparent from Figure 6, the rotor 10 has a hollow central portion into which the directional probe or tool 16 may be inserted. The directional probe or tool 16 extends through the entire length of the rotor 10 and one end terminates in a pick up loop 18 which extends into the coaxial transmission line 20. The pick up loop 18 of the directional probe 16 extends through an opening 22 in outer conductor 24 and in close proximity to inner conductor 26 of the coaxial transmission line 20. In the embodiment of Fig. 6 in which the detent mechanism is shown with a directional probe, one end of pick up loop 18 is connected to a terminating resistance 17 mounted in rotor 10 and the end is connected to the center conductor 16A of a section of coaxial line disposed longitudinally in rotor 10. The other end of the outer conductor 16A terminates in a conventional coaxial connector 17A mounted on the end of rotor 10 opposite to pick up loop 18. The probe 16 may be used to measure the incident and reflected power present in coaxial transmission line 20.

The inner diameter of the stator 30 is slightly greater than the diameter of the rotor 10 for close clearance between the two elements. As shown in Fig. 2, which is a plan view through the stator at the position of an annular groove 28 in the inner surface of the stator there are two linear depressions 32 and 34 which extend across the annular groove in the inner surface of the stator and in Fig. 6, shown at 29, there is an annular groove in rotor 10 across which linear depressions 12 and 14 extend. The annular grooves are made in the surfaces of the stator and the rotor to receive therebetween a coiled helical spring 36 which has spring action at each end against cylindrical rollers 40 and 42 positioned between the stator and the rotor at one of the depressions 12, 14, 32 or 34, depending on the position of the rotor. The diameter of the rollers is greater than the clearance between the rotor and the stator at the annular grooves by an amount equal to the depth of a depression 32 or 34 in the stator or by an amount equal to the depth as a depression 12 or 14 in the rotor wherein each of the cylindrical rollers will always be lodged in one of the depressions 12, 14, 32 or 34. The diameter of the rollers with respect to the rotor and stator at the annular grooves is such that the diameter of the rollers is greater than the difference between the radius of said rotor and the radius of the inner surface of said stator at the annular groove by an amount equal to the depth of one of said depressions across the annular groove in the stator or rotor. Since the diameter of the rollers is greater than the clearance between the stator and the rotor, the rotor can rotate only when the rollers 40 and 42 are positioned respectively in the depressions 12 and 34 or either respectively positioned in depressions 32 and 14 depending on the direction in which the rotor is rotated.

Figure 3 discloses the position of the various elements of the detent mechanism as the rotor 10 is being rotated in a counterclockwise direction. In this position, the cylindrical roller 40 is in the depression 32 of the circumferential surface of the annular groove in the inner surface of stator 30 and is thus transmitting the force of the coiled helical spring 36 to the stator 30. At the same time, cylindrical roller 42 is in depression 14 of the rotor 10 and is transmitting the force of the coiled helical spring 36 to the rotor 10. The resultant of these two forces turns the rotor 10 in a counter-clockwise direction.

Figure 4 illustrates the position of the various elements of the detent mechanism at the point of transition. At this point, the rotor 10 has been turned clockwise against the force of the coiled helical spring 36 approximately 90 degrees from the position shown in Figure 3. Cylindrical roller 42 is changing from depression 14 in the rotor 10 to depression 34 in the stator 30. This is assuming clockwise rotation of the rotor 10. Also at this time, cylindrical roller 40 is changing from depression 32 of the stator 30 to depression 12 of the rotor 10. The operation of the coiled helical spring 36 at this point resembles the action of an over-center spring in a circuit breaker. That is the coiled helical spring 36 is compressed until it reaches the transition point and then it begins to expand.

Figure 5 discloses the relative position of the various elements after passing through the transition point and with the rotor 10 being moved in a clockwise direction 180° from the position shown. The cylindrical roller 40 is now in depression 12 of the rotor 10 and the cylindrical roller 42 is in depression 34 of the stator 30. With the cylindrical rollers 40 and 42 in this position, the coiled helical spring 36 will tend to turn the rotor 10 in a clockwise direction.

The stops necessary to determine the end points of rotation are clearly shown in Figure 7. These stops are positioned for 180 degrees of rotation of the rotor 10. As can be seen from Figure 7, stop 60, which consists of a lug that is an integral part of the rotor 10 and extends along one quarter of the periphery thereof. Stop 62, which is also a lug that is an integral part of the stator 30 and extends inwardly along one quarter of the inner surface thereof juxtaposed rotor 10 and positioned between the extremities of the stop lug 60. These stops 60 and 62 abut each other when the detent mechanism is in one position. When the rotor 10 is rotated 180 degrees the stop 60 again abuts the stop 62 but on the opposite face of stop 62. In order to achieve a balanced operation, the stops should be symmetrically located about the transition point.

Ball bearings 50 and 52 are placed above and below the coiled helical spring 36 and the cylindrical rollers 40 and 42 to assure easy operation. This is clearly shown in Figure 6.

It should be noted that the detent mechanism depends upon the interaction between the coiled helical spring, the cylindrical rollers, and the stop means to provide positive detent action.

Thus, it can be seen by the use of a rotor having depressions, a stator having depressions in the circumferential surface of an annular groove in the inner surface thereof, a coiled spring and rollers placed between the rotor and the circumferential surface of the annular groove in the inner surface of the stator, said rollers riding in depressions formed in the stator and rotor element, a novel detent mechanism is produced. This mechanism provides a rotor which is spring loaded against all stops and at the same time leaves the longitudinal axis of the rotor free to permit insertion of tools of various types. Further, the novel detent mechanism may be used with adjustable stops to achieve various degrees of rotation. Lastly, the detent device or mechanism requires only rotary motion without any cocking or locking motions to activate the device.

From the foregoing description of the present invention, it is apparent that considerate modification of the features thereof is possible without exceeding the scope of the invention which is defined in the appended claims.

The invention described herein may be manufactured and used by or for the Government of the United States of America for governmental purposes without the payment of any royalties thereon or therefor.

What is claimed is:

1. A detent device comprising a stator carrying stop means and having linear depressions which extend across an annular groove in its inner surface, a rotor fitted within said stator and having linear depressions in its surface which extend across an annular groove in its outer surface and carrying stop means disposed to abut the stop means of said stator, roller means adapted to be carried in said depressions of said stator and said rotor, and spring means disposed between said stator and said rotor within said annular grooves and in engagement with said roller means to rotate said rotor with respect to said stator when said roller means are positioned in a depression on said stator and a depression on said rotor by the action of said spring in engagement with said roller means.

2. A detent device comprising a stator carrying stop means and having linear depressions which extend across an annular groove in its inner surface, a rotor fitted within said stator and having a hollow central portion and having linear depressions in its surface which extend across an annular groove in its outer surface and carrying stop means disposed to abut the stop means of said stator, roller means adapted to be carried in said depression of said stator and said rotor, and spring means disposed between said stator and said rotor within said annular grooves and in engagement with said roller means to rotate said rotor with respect to said stator when said roller means are positioned in a depression on said stator and a depression on said rotor by the action of said spring in engagement with said roller means.

3. A detent device comprising a stator carrying stop means and having linear depressions which extend across an annular groove in its inner surface, a rotor fitted within said stator and having a hollow central portion along its longitudinal axis and having linear depressions in its surface which extend across an annular groove in its outer surface and carrying stop means disposed to abut the stop means of said stator, roller means adapted to be carried in said depressions of said stator and said rotor, and spring means disposed between said stator and said rotor within said annular grooves and in engagement with said roller means to rotate said rotor with respect to said stator when said roller means are positioned in a depression on said stator and a depression on said rotor by the action of said spring in engagement with said roller means.

4. A detent device comprising a stator carrying stop means and having linear depressions which extend across an annular groove in its inner surface, a rotor fitted within said stator and having a hollow central portion along its longitudinal axis and having linear depressions in its surface which extend across an annular groove in its outer surface and carrying stop means disposed to abut the stop means of said stator, roller means adapted to be carried in said depressions of said stator and said rotor, and spring means disposed between said stator and said rotor within said annular grooves and in engagement with said roller means to rotate said rotor with respect to said stator when said roller means are positioned in a depression on said stator and a depression on said rotor by the action of said spring in engagement with said roller means until said stop means are in abutment, and said stop means also being spring loaded in said position.

5. A detent device comprising a stator having linear depressions which extend across an annular groove in its inner surface and carrying stop means, a rotor fitted within said stator and having linear depressions which extend across an annular groove in its outer surface and carrying stop means disposed to abut the stop means of said stator, roller means adapted to be carried in said depressions of said stator and said rotor, the diameter of said roller means being greater than the difference between the radius of said rotor and the radius of the inner surface of said stator at the annular groove, and spring means in engagement with said roller means to rotate said rotor with respect to said stator when said roller means are positioned in a depression on said stator and in a depression on said rotor by the action of said spring in engagement with said roller means.

6. A detent device comprising a stator carrying stop means and having linear depressions which extend across an annular goove in its inner surface, a rotor fitted within said stator and having a hollow central portion along its longitudinal axis and having linear depessions in its surface whch extend across an annular groove in its outer surface and carrying stop means disposed to abut the stop means of said stator, roller means adapted to be carried in said depressions of said stator and said rotor, the diameter of said roller means being greater than the difference between a radius of said rotor and the radius of the inner surface of said stator at the annular groove by an amount equal to the depth of one of said depressions across the annular groove in the stator or rotor, and spring means disposed between said stator and said rotor within said annular grooves and in engagement with said roller means to rotate said rotor with respect to said stator when said roller means are positioned in a depression on said stator and a depression on said rotor by the action of said spring in engagement with said roller means until said stop means are in abutment, and said stop means also being spring loaded in said position.

7. A detent device comprising a stator carrying a stop means, a rotor fitted within said stator and having a stop means thereon adapted to abut the stop means of said stator, roller means disposed between said stator and said rotor, and spring means disposed between said rotor and said stator within annular grooves within the outer surface of said rotor and the inner surface of said stator, said spring means engaging said roller means to rotate said rotor with respect to said stator.

8. A detent device as claimed in claim 7, in which said stop means on said stator is spring loaded to abut said stop means and said rotor.

9. A detent device comprising a stator having an integral stop means thereon and an annular groove in the inner surface thereof, a rotor secured within said stator and having an integral stop means thereon adapted to abut said stop means on said stator and an annular groove in the outer surface thereof oppositely disposed to said annular groove in said stator, roller means disposed between said stator and said rotor, the diameter of said roller means being greater than the difference between the radius of the rotor and the radius of the stator at the annular groove in the surface thereof, and spring means in engagement with said roller means to rotate said rotor with respect to said stator.

10. A detent device comprising a stator having linear depressions which extend across an annular groove in its inner surface and having integral stop means thereon, a rotor secured within said stator and having linear depressions on its outer surface which extend across an annular groove therein and integral stop means adapted to abut the stop means of said stator, cylindrical rollers adapted to be carried in said depressions of said stator and said rotor, the diameter of said cylindrical rollers being greater than the difference between the radius of said rotor and the radius of said stator at the annular groove, said diameter of said rollers also being less than the difference between said radii when including a measure of a depression in either of the respective surfaces, and spring means in engagement with said rollers to move said rotor with respect to said stator.

References Cited in the file of this patent

UNITED STATES PATENTS

| | | |
|---|---|---|
| 706,039 | Everest | Aug. 5, 1902 |
| 999,808 | Leppert | Aug. 8, 1911 |
| 1,036,690 | Novak | Aug. 27, 1912 |
| 2,155,594 | Hart | Apr. 25, 1939 |
| 2,438,672 | Margrave | Mar. 30, 1948 |